United States Patent
Meloche

(10) Patent No.: US 8,144,734 B2
(45) Date of Patent: Mar. 27, 2012

(54) INTELLIGENT MULTI-PACKET HEADER COMPRESSION

(75) Inventor: Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 165 days.

(21) Appl. No.: 12/436,651

(22) Filed: May 6, 2009

(65) Prior Publication Data

US 2010/0284426 A1 Nov. 11, 2010

(51) Int. Cl.
*H04J 3/16* (2006.01)
(52) U.S. Cl. ........................................ 370/471
(58) Field of Classification Search .............. 370/349, 370/389, 392, 394, 395.1, 471, 474, 477
See application file for complete search history.

(56) References Cited

U.S. PATENT DOCUMENTS

| | | |
|---|---|---|
| 6,243,454 B1 | 6/2001 | Eslambolchi |
| 6,411,923 B1 | 6/2002 | Stewart et al. |
| 6,542,504 B1 | 4/2003 | Mahler et al. |
| 6,760,345 B1* | 7/2004 | Rosengard ............... 370/477 |
| 6,775,240 B1 | 8/2004 | Zhang et al. |
| 7,136,359 B1 | 11/2006 | Coile et al. |
| 7,173,910 B2 | 2/2007 | Goodman |
| 7,203,173 B2 | 4/2007 | Bonney et al. |
| 7,340,529 B1 | 3/2008 | Yazaki et al. |
| 7,558,290 B1* | 7/2009 | Nucci et al. ............... 370/477 |
| 7,899,048 B1 | 3/2011 | Walker et al. |
| 2001/0050903 A1 | 12/2001 | Vanlint |
| 2002/0012388 A1 | 1/2002 | Eldumiati et al. |
| 2002/0021680 A1 | 2/2002 | Chen |
| 2002/0057690 A1 | 5/2002 | Kingsley |
| 2002/0191614 A1 | 12/2002 | Ido et al. |
| 2002/0193999 A1 | 12/2002 | Keane et al. |
| 2003/0028634 A1 | 2/2003 | Oshizawa |
| 2003/0086425 A1 | 5/2003 | Bearden et al. |
| 2003/0165162 A1 | 9/2003 | Westphal |
| 2004/0052216 A1 | 3/2004 | Roh |
| 2004/0172464 A1 | 9/2004 | Nag |
| 2005/0041660 A1 | 2/2005 | Pennec et al. |
| 2006/0215596 A1 | 9/2006 | Krishnaswamy et al. |

(Continued)

FOREIGN PATENT DOCUMENTS

EP 1763193 A1 3/2007

(Continued)

OTHER PUBLICATIONS

Network Instruments, "VoIP Analysis, Manager, Monitor, and Maintain VoIP Communications Across Enterprise Networks with Observer," 2006, Product Brochure, US, 4 pages.

(Continued)

*Primary Examiner* — Kwang B Yao
*Assistant Examiner* — Tung Q Tran
(74) *Attorney, Agent, or Firm* — Sheridan Ross P.C.

(57) ABSTRACT

A packet analyzer(s) gets multiple packets, typically of a communication between communication devices. The multiple packets use the same protocol and contain one or more protocol headers with individual field(s) that contain data. The packets are organized into an array of packets. Each packet is a row in the array of packets. Each column in the array is comprised of the same field in each packet in the array of packets. The data in the fields in the column are then compressed into a compression packet.

22 Claims, 6 Drawing Sheets

U.S. PATENT DOCUMENTS

| | | | |
|---|---|---|---|
| 2006/0218447 | A1 | 9/2006 | Garcia et al. |
| 2006/0227714 | A1 | 10/2006 | Griffin et al. |
| 2007/0081471 | A1 | 4/2007 | Talley, Jr. et al. |
| 2007/0086336 | A1 | 4/2007 | Richards et al. |
| 2007/0252695 | A1 | 11/2007 | Bhavani |
| 2007/0286351 | A1 | 12/2007 | Ethier et al. |
| 2009/0073906 | A1* | 3/2009 | Yi et al. ............ 370/310 |
| 2009/0268622 | A1 | 10/2009 | Blum et al. |
| 2010/0027429 | A1 | 2/2010 | Jorgens et al. |

FOREIGN PATENT DOCUMENTS

| | | |
|---|---|---|
| EP | 1228619 B1 | 2/2008 |
| WO | WO 2006/065863 A2 | 6/2006 |
| WO | WO 2007/036786 A2 | 4/2007 |

OTHER PUBLICATIONS

Meloche, Jean, U.S. Appl. No. 12/533,483, entitled "System and Method for Comparing Packet Traces for Failed and Successful Communications," filed Jul. 31, 2009, 30 pages.

Meloche, Jean, U.S. Appl. No. 12/622,840, entitled "Detection and Display of Packet Changes in a Network," filed Nov. 20, 2009, 27 pages.

Flockhart, et al., U.S. Appl. No. 12/239,120, filed Sep. 26, 2008, for "Clearing House for Publish/ Subscribe of Status Data From Distributed Telecommunications Systems".

Meloche, U.S. Appl. No. 12/433,630, filed Apr. 3, 2009, for "System and Method for Monitoring a Network Communication at Multiple Network Layers".

Meloche, U.S. Appl. No. 12/410,980, filed Mar. 25, 2009, for "System and Method for Sending Packets Using Another Device's Network Address".

Denby, U.S. Appl. No. 12/039,878, filed Feb. 29, 2008, for "Endpoint Device Configured to Permit User Reporting of Quality Problems in a Communication Network".

Meloche, U.S. Appl. No. 12/434,265, filed May 1, 2009, for "System and Method for Testing a Dynamic Communication Across a Network".

Webpage, "Visual Performance Manager for Application Performance Management—Fluke Networks," (website: http://www.flukenetworks.com/fnet/en-us/products/Visual+Performance+Manager/Overview...), Printed Mar. 13, 2009, Fluke Networks, 2 pages.

* cited by examiner

INTELLIGENT MULTI-PACKET HEADER COMPRESSION

TECHNICAL FIELD

The system and method relates to data compression and in particular to systems and methods for compressing multi-packet header data.

BACKGROUND

Currently, there are a variety of schemes for compressing packet headers. These schemes however, focus on compressing packet headers in individual packets. For example, U.S. Pat. No. 6,542,504 discloses a system "for compression of packet header information of packets transmitted on a point to point link." A profile is used in order to compress and then decompress the packet headers of each packet. The compression and decompression of the packet header is done individually in each packet that is sent across the point to point link Likewise, U.S. Patent Application Publication No. 2005/0041660 discloses a system for compressing the headers of data packets. A template is used to compress and decompress individual packets. Again the focus is on compressing packet headers in individual packets.

These systems are not designed to compress the headers in multiple groups of packets. By focusing on individual packets, current compression schemes cannot benefit in the redundancy of information in packet headers. Much of the data in header fields in the packets sent in a communication tend to have the same data. For example, the source port number and the destination port number in a User Datagram Protocol (UDP) header of all/most packets in a communication between two devices will be the same. Systems that compress packets individually cannot leverage the redundancy of non-changing packet header fields across groups of packets in a communication.

SUMMARY

The system and method are directed to solving these and other problems and disadvantages of the prior art. A packet analyzer(s) gets multiple packets, typically of a communication between communication devices. The multiple packets use the same protocol and contain one or more protocol headers with individual field(s) that contain data. The packets are organized into an array of packets. Each packet is a row in the array of packets. Each column in the array is comprised of the same field in each packet in the array of packets. The data in the fields in the column are then compressed into a compression packet.

The data can be compressed in various ways. For example, fields where the data does not change are compressed by identifying the number of consecutive packets in the array that contain the same data. Data in error checking fields such as checksums of a column are compressed by verifying that each of the error checking fields in the column is valid. If an error checking field in the column is valid, the error checking field is overwritten with a first value. If an error checking field in the column is not valid, the error checking field is overwritten with a second value. The process of checking for consecutive fields and then compressing the consecutive fields is then repeated for the error checking column.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Figure 1:
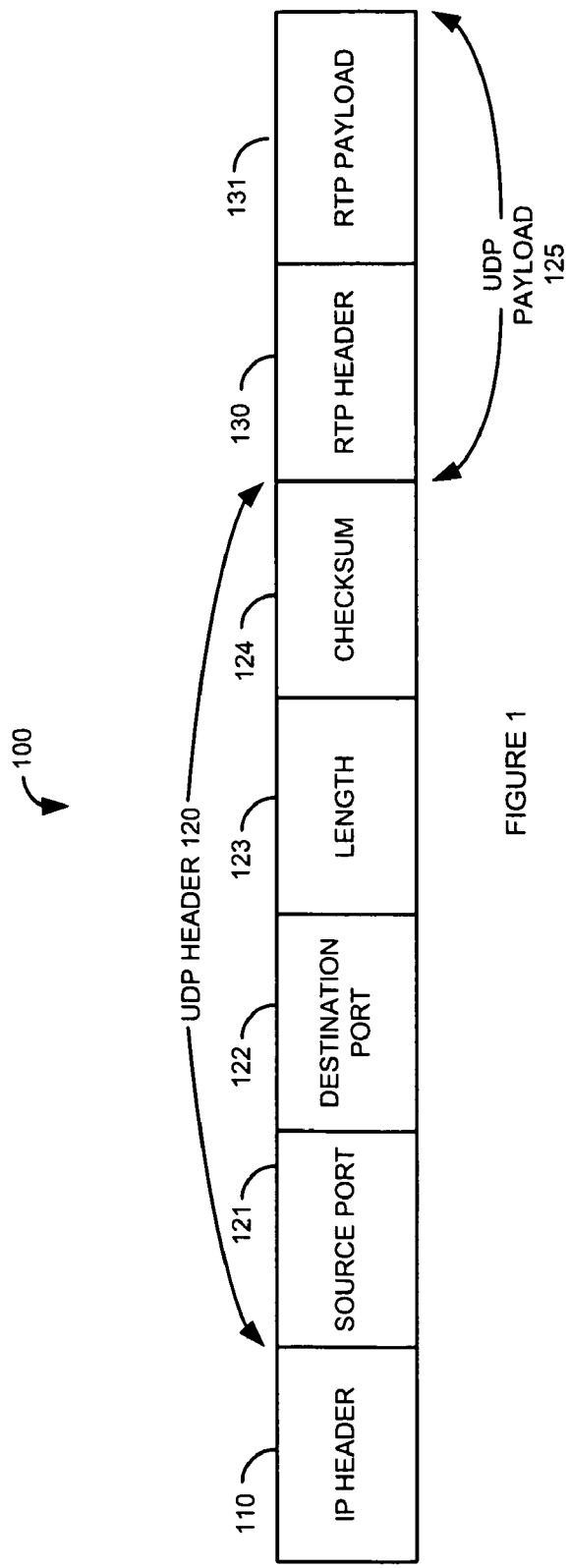
FIG. 1 is a diagram of a typical Internet Protocol (IP)/User Datagram Protocol (UDP) packet.

FIG. 1 is a diagram of a typical Internet Protocol (IP)/User Datagram Protocol (UDP) packet 100 that is sent with Real Time Protocol (RTP) data. A typical IP packet 100 comprises multiple protocol headers such as an IP header 110, a UDP header 120, a Real Time Transport Protocol (RTP) header 130, and the like. The headers 110, 120, and 130 typically comprise one or more fields 121-124. For example, a UDP header 120 comprises five fields: a source port 121, a destination port 122, a length field 123, a checksum field 124, and a UDP payload 125. Many of the fields in a protocol header 110, 120, and 130 typically will be the same for an individual communication. For example, in an RTP stream from communication device 201A (FIG. 2) to communication device 201B (FIG. 2), the UDP source port 121 and the UDP destination port 122 of the packets in the RTP stream will typically be the same. In many instances, the UDP length field 123 will be the same because of a constant packet size of the RTP stream. The checksum field 124 will be different for each packet. Other fields (e.g. the RTP payload 131) may vary based on the data being sent in the packet. In some protocols, fields may increment or decrement by some known value (e.g. by one) for each packet being sent in a communication. Fields in the protocol header of a packet can vary in size and type including, but not limited to a timestamp, a source address, a destination address, a source port, a destination port, an identification field, a bit, a byte, a word, and a long word. Protocol headers can include headers at any level in the protocol stack (e.g. the Open System Interconnect (OSI) 7 layer model) such as the Media Access (MAC) layer (data link layer), the network layer, the transport layer, the session layer, the presentation layer, and the application layer.

Figure 2:
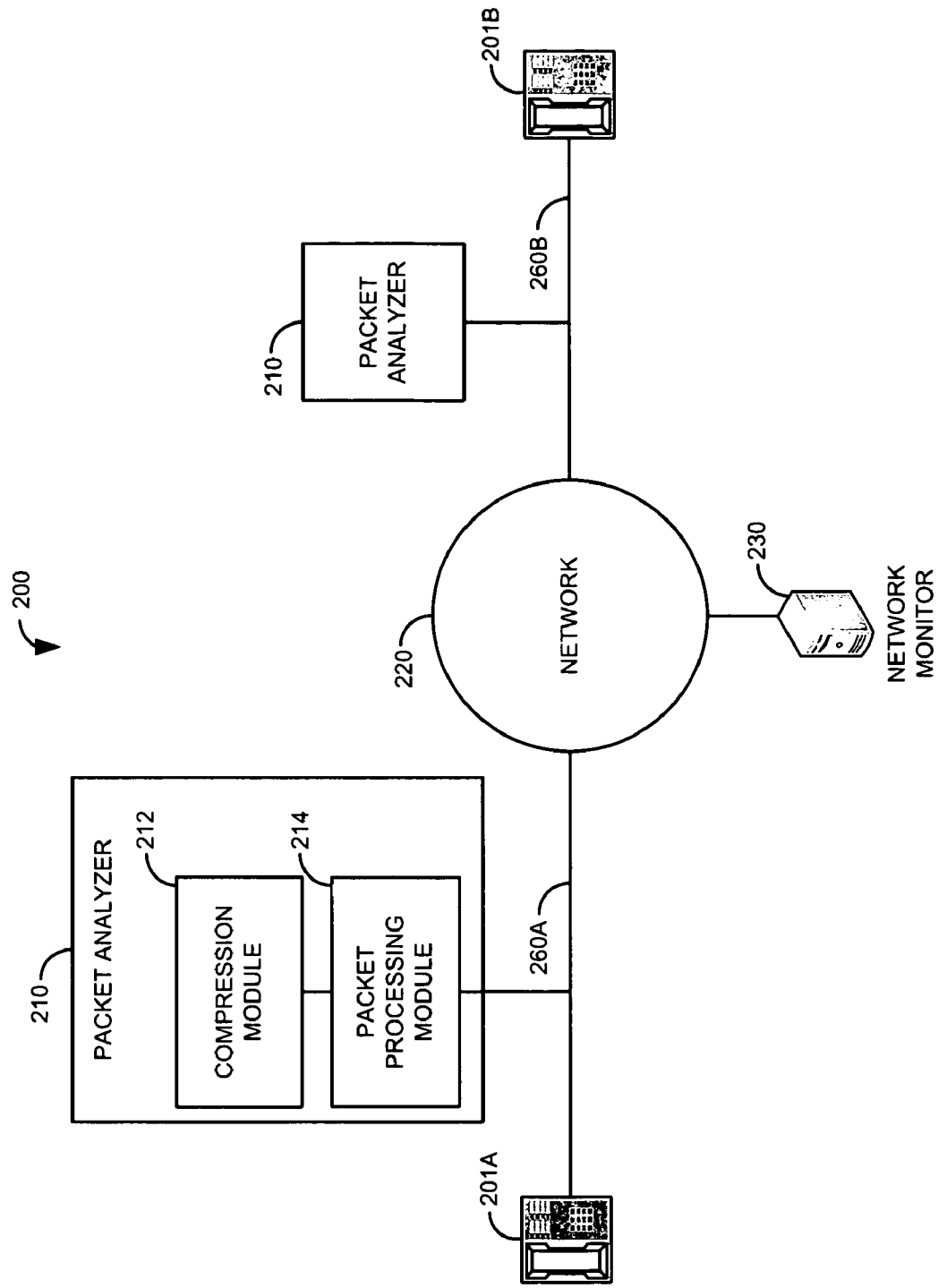
FIG. 2 is a block diagram of a first illustrative system for compressing packet headers.

FIG. 2 is a block diagram of a first illustrative system 200 for compressing packet headers. The first illustrative system 200 comprises communication devices 201, a packet analyzer(s) 210, a network 220, a network monitor 230, and communication links 260. The communication devices 201 can be any type of device that can communicate information such as a telephone, a cellular telephone, a Personal Digital Assistant (PDA), a Personal Computer (PC), a web server, a video camera, a camera, a video server, and the like.

The packet analyzer(s) 210 are used to receive packets of a communication between communication devices 201. The packets can be packets of various protocols such as Internet Protocol (IP), User Datagram Protocol (UDP), Transmission Control Protocol (TCP), Real Time Transport Protocol (RTP), H.323, Session Initiation Protocol (SIP), High Level Data Link Control (HDLC), and the like. The packet analyzer(s) 210 are configured using known techniques. For example, the system and method disclosed in U.S. patent application Ser. No. 12/410,980, which is incorporated herein by reference, discloses a way that the packet analyzer(s) 210 can be configured to monitor packets in the first illustrative system 200. The packet analyzer(s) 210 could be passive network analyzers or the packet analyzer(s) 210 could be bridged network analyzers. The packet analyzer(s) 210 may be any device capable of processing and compressing packets. The packet analyzer(s) 210 further comprises a compression module 212 and a packet processing module 214. The compression module 212 can be any hardware and/or software capable of compressing data. The packet processing module 214 can be any hardware and/or software capable of sending and receiving packets.

The network monitor 230 can be any device capable of monitoring network communications such as a server, a Private Branch Exchange (PBX), a Personal Computer (PC), a communication device 201, and the like. The network monitor 230 can be distributed between multiple devices, including the communication devices 201. The network 220 can be any type of packet network such as the Internet, a Local Area Network (LAN), the Public Switched Telephone Network (PSTN), a cellular network, and the like. The communication links 260 can be any type of communication link such as an Ethernet link, a fiber optic link, a wired link, a wireless link, and the like.

The packet processing module 214 receives a plurality of packets, typically of a communication between communication devices 201 (e.g. between communication device 201A and communication device 201B) by monitoring packets on the communication link 260. The packet processing module 214 can monitor individual communication devices 201 involved in a communication. In addition, the packet processing module can monitor packets from multiple devices involved in the communication based on a bill of materials for the communication. The packets have one or more protocol headers, each protocol header having one or more fields. The fields contain data. The packets may contain headers from different protocols. For example, the packets may be IP/UDP packets 100 as shown in FIG. 1.

Figure 3:
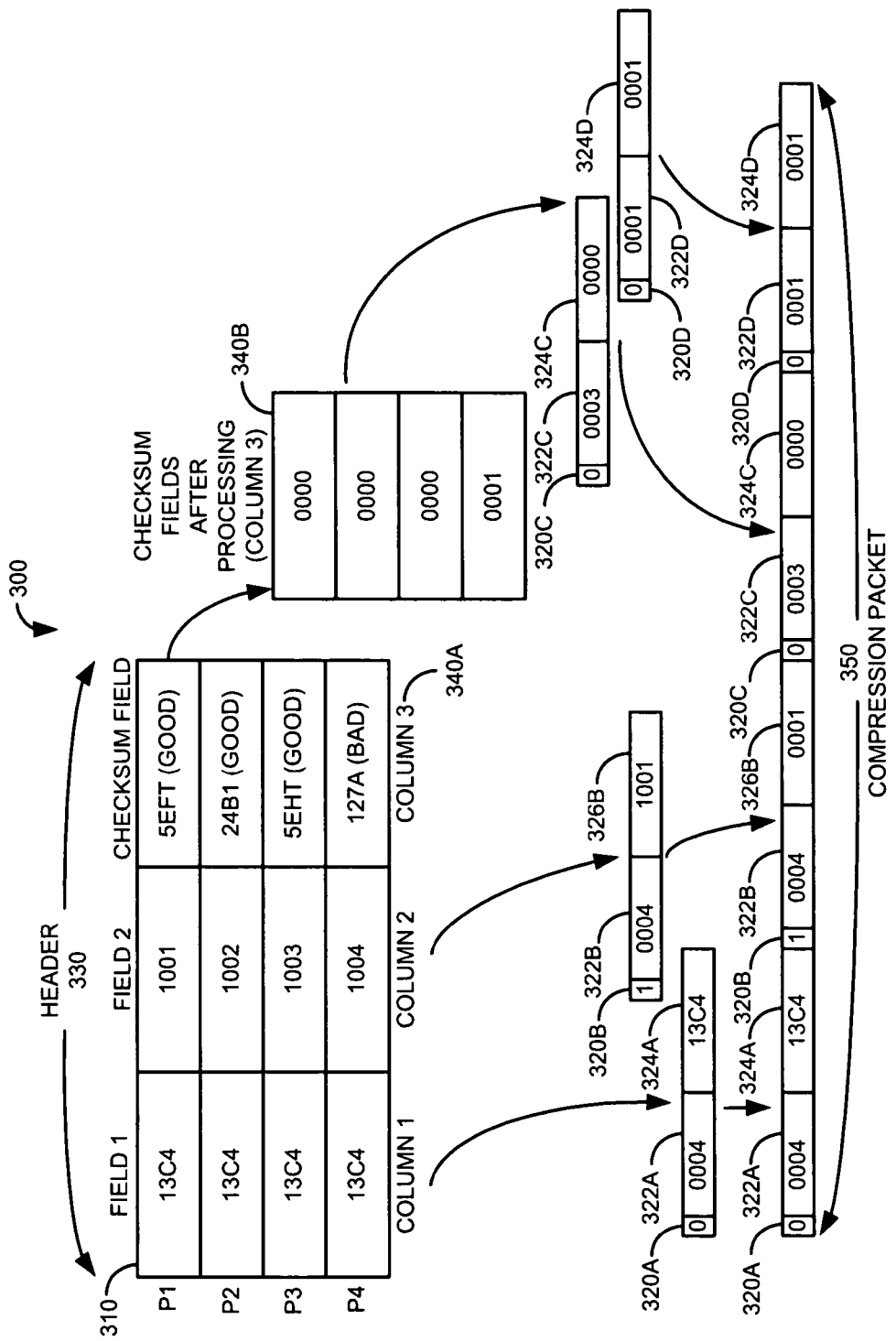
FIG. 3 is a diagram illustrating how each column in an array of packets is compressed.

The packet processing module 214 in the packet analyzer(s) 210 gets the received packets and organizes the received packets into an array of packets (See FIG. 3, element 310). The array of packets 310 is a logical construct used to describe how multi-packet fields are compressed. Each row and column is a logical construct as well. For example, each column and/or row may physically reside in a table in a database. The actual physical organization of the data in the array of packets may vary according to implementation. The array of packets 310 may be organized as rows that are vertical and columns that are horizontal. The packet analyzer(s) 210 is acting like a network analyzer and receives the packets by monitoring packets sent across a communication link 260A. However, in other example embodiments, the packet analyzer(s) 210 may get the packets in a different way than monitoring packets on a communication link 260A. For example, the packet processing module 214 could get the packets from a database (not shown).

The array of packets comprises rows and one or more columns. Each of the received packets is a row in the array of packets. The one or more columns are organized based on one or more fields (the same field of the same protocol header). For example, the packet processing module 214 can organize a column based on a single protocol field (e.g. the UPD source port 121). The packet processing module 214 can organize the array of packets with multiple columns (1 column for each field) based on multiple protocol fields in multiple protocol headers (e.g. one column for a field in the IP header 110, one column for the UDP source port 122, one column for the UDP destination port 122, one column for the UDP length 123, one column for the UPD checksum 124, and one column for a field in the RTP header 130). A column contains the same protocol field from a specific protocol header from each packet in the array of packets.

The compression module 212 compresses the data in the column. The compression of the data is of at least two consecutive fields in the column. For example, if two IP/UDP packets 100 were received and the column is organized based on the UPD source port 121, the compression would be done on the UPD port 121 of the first packet and the UPD port 121 of the second packet (assuming that both UPD ports 121 were the same in both packets). If the array of packets was organized on two columns (e.g. the UPD source port 121 and the UPD destination port 122), a first compression would be done on the UPD source port 121 of the first and second packets and a second compression would be done on the UPD destination port of the first and second packets (assuming that the data in both columns is the same). The compression can be done in various ways, depending upon the data in the column being compressed.

The compression module 212 can achieve greater compression because the data in the fields in the headers for a specific communication tend to be similar. Likewise, the size of the packets in a particular communication tends to be similar in length. The greater the similarity of packets, the more compression can be accomplished in the compression packet. The compression of the headers can be done at various levels. For example, instead of looking at specific packets in a specific device, compression can be done at the application layer (compress application layer headers) based on a specific communication and any devices associated with the communication (bill of materials for the communication). This allows greater compression of packets because fields in the packet headers for a specific session tend to be the same (e.g. the RTP header 130, the UDP source port 121, and the UDP destination port 122) for a communication. In addition, multiple communications can be monitored and individually compressed into separate compression packets. Which fields in which headers that are compressed can be based on a variety of criteria.

FIG. 3 is a diagram 300 illustrating how each column (columns 1-3) in an array of packets 310 is compressed. In this illustrative example, there are four packets P1-P4 in the array of packets 310. After getting the packets P1-P4, the packet processing module 214 organizes the packets P1-P4 into the array of packets 310. In this example, the protocol header 330 contains three fields (Field 1, Field 2, and the Checksum Field). The fields (Field 1, Field 2, Checksum Field) in the protocol header 330 of each of the packets P1-P4 are organized by the packet processing module 214 into columns (Columns 1-3). Field 1 of the protocol header 330 in each packet P1-P4 comprises column 1. Field 2 of the protocol header 330 in each packet P1-P4 comprises column 2. The checksum field in the protocol header 330 of each packet P1-P4 comprise column 3.

The compression module 212 compresses column 1 by identifying if at least two consecutive fields in column 1 are the same. In this example, all four fields in column 1 are the same. Since there are four consecutive fields in column 1 that are the same, the compression module 212 identifies the total number of consecutive fields in column 1 that are the same (four). The compression module 212 builds a compression packet 350 that contains the total number of consecutive fields (322A), and the data 13C4 in at least one of the consecutive fields in column 1 (324A). In this example, a compression type field 320 is also included for column 1 (320A). The compression type field 320 is used to identify the type of compression being done. The compression field 320A (value of 0) indicates a compression of identical data being compressed. If the only data being compressed in the compression packet 350 is identical data, then the compression field 320 to indicate the type of compression would not be necessary.

The compression module 212 compresses column 2 by identifying if at least two consecutive fields in column 2 increments by a value. In this example, each of the fields in column 2 increment by one. Since the fields increment by one, the compression module 212 identifies the total number of consecutive fields in column 2 that increment by one (four). The compression module 212 builds the compression packet 350 that comprises the total number of consecutive fields (four) in column 2 that increment (322B), the increment value (one) (320B), and the beginning field in the consecutive fields (field 2 in P1 with a value of 1001 (326B). In this example, the increment value is used as compression type 320A because there is only one field (column 2) that increments by one so there are only two compression types (identical data 320A and incrementing data by one 320B).

The checksum field is an error checking field that verifies if the data in the protocol header 330 is valid (and potentially a payload 125 or 131). In this example, a checksum field is used; however, other types of error checking fields can be used such as a Cyclic Redundancy Check (CRC), parity, and the like. The compression module 212 verifies if each of the error checking fields in column 3 (340A) are valid. The compression module 212 overwrites the fields in column 3 (340A) that have a valid checksum with a first value (0000, see column 3, 340B, first three fields). The compression module 212 overwrites the fields in column 3 that have an invalid checksum with a second value (0001, see column 3, 340B, last field). Thus column 3 now contains the data in 340B instead of the checksums.

The compression module 212 compresses column 3 (340B) by identifying if at least two consecutive fields in column 3 (340B) are the same. Since there are three consecutive fields in column 3 (340B) that are the same (the first three fields in column 3 (340B), the compression module 212 identifies the total number of consecutive fields in column 3 that are the same (three). Since not all of the values in column 3 (340B) are the same, the column is divided up into sections (section 1 for the first three fields in column 3 (340B), and section 2 for the last field in column 3 (340B)). The compression module 212 builds the compression packet 350 for the first section that contains the total number of consecutive fields (322C), and the data 0000 (324C) in at least one of the consecutive fields in column 3 (340B). The compression type field 320C identifies the type of compression being done (identical data).

Since not all of column 3 (340B) has been compressed (the last field in column 3 (340B) has not been compressed), the compression module 212 must complete compression of the array of packets 310. To do this, the above process is repeated for a single field in column 3 (340B). The compression module 212 compresses the last field in column 3 (340B) (section 2) by identifying the total number of consecutive fields in the rest of column 3 (340B) that are the same (one). The compression module 212 completes the building of the compression packet 350 that contains the total number of consecutive fields (322D) and the data 0001 (324D) in consecutive fields in column 3 (340B). The compression type field 320D identifies that type of compression being done (identical data).

The compression packet 350 can be sent using known packet sending techniques (e.g. IP/UDP). This can include sending the compression packet in a single or in multiple packets. The compression of a column can include compressing the payload (125 and/or 121) of packets as well as protocol headers 110, 120, 130. Moreover, the compression packet 350 could be further compressed using known compression techniques. The packet processing module 214 sends the compression packet 350 to the network monitor 230. The compression packet 350 can optionally include a size of the array of packets 310. The size of the array of packets 310 does not have to be sent if, for example, the array size is known. The packet processing module 214 can send the compression packet based on a variety of conditions and/or combination of conditions including, but not limited to: when the number of packets exceeds a threshold, when a time period has been exceeded, if a length of one of the plurality of packets is different, if the specific protocol in one of the plurality of packets is different, and the like.

The network monitor 230 receives the compression packet 350. The network monitor 230 can then uncompress the compression packet 350. The network monitor 230 un-compresses the array of packets 310 using the reverse process that was used to compress the array of packets 310.

Figure 4:
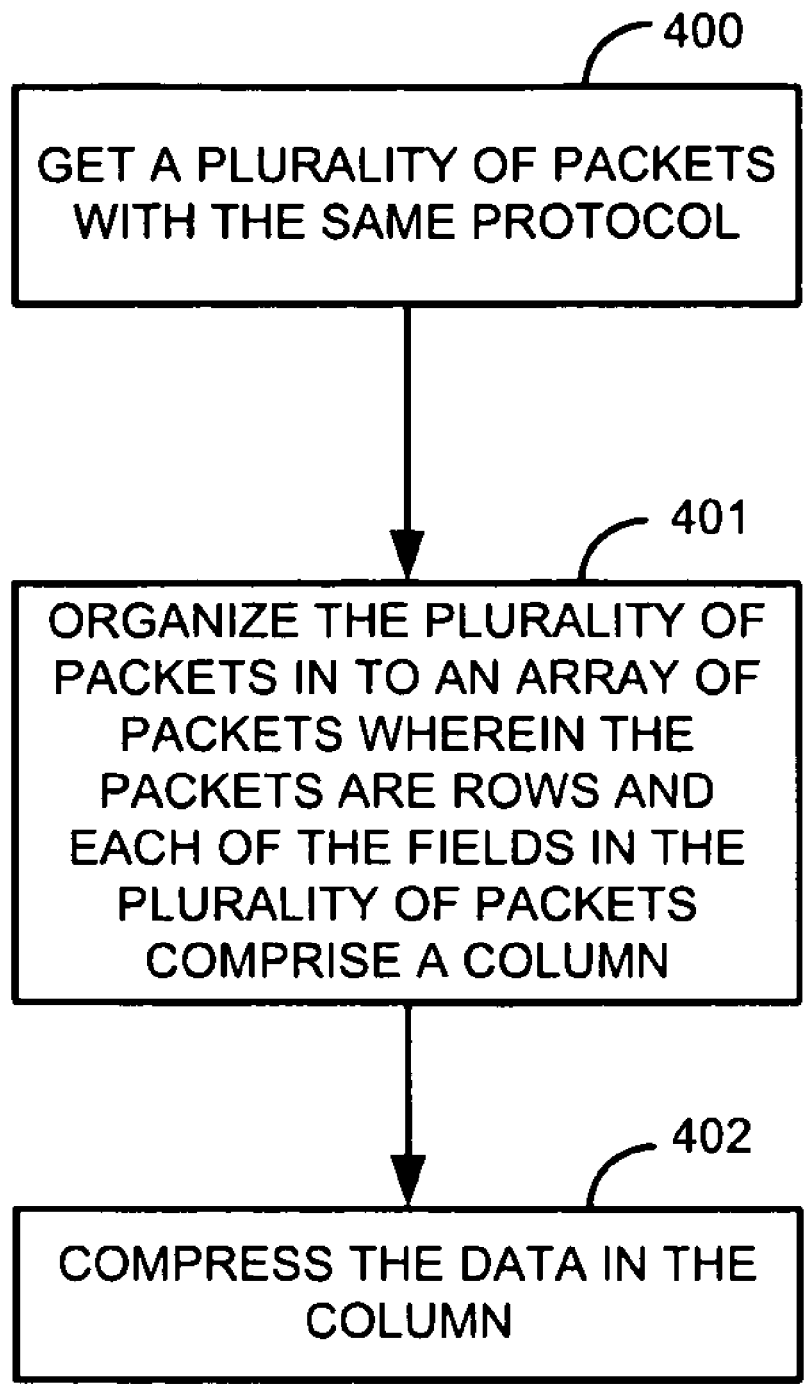
FIG. 4 is a flow diagram of a method for compressing packet headers.

FIG. 4 is a flow diagram of a method for compressing packet headers. Illustratively, the communication devices 201, the packet analyzer(s) 210, and the network monitor 230 are stored-program-controlled entities, such as a computer, which performs the method of FIGS. 4-6 by executing a program stored in a storage medium, such as a memory or disk.

The packet processing module 214 gets 400 a plurality of packets from monitoring packets on a communication link 260. Each of the plurality of packets comprises a protocol header 330, each protocol header comprising a field, each field comprising data. Each of the protocol headers 330 is a header of the same protocol. The packet processing module 214 organizes 401 the plurality of packets into an array of packets 310. The array of packets 310 comprises rows and one or more columns. The packets form the rows in the array of packets 310. The fields in the protocol header 330 form one or more columns as described in FIG. 3. On a column basis, the compression module 212 compresses 402 the data in each one of the columns.

Figure 5:
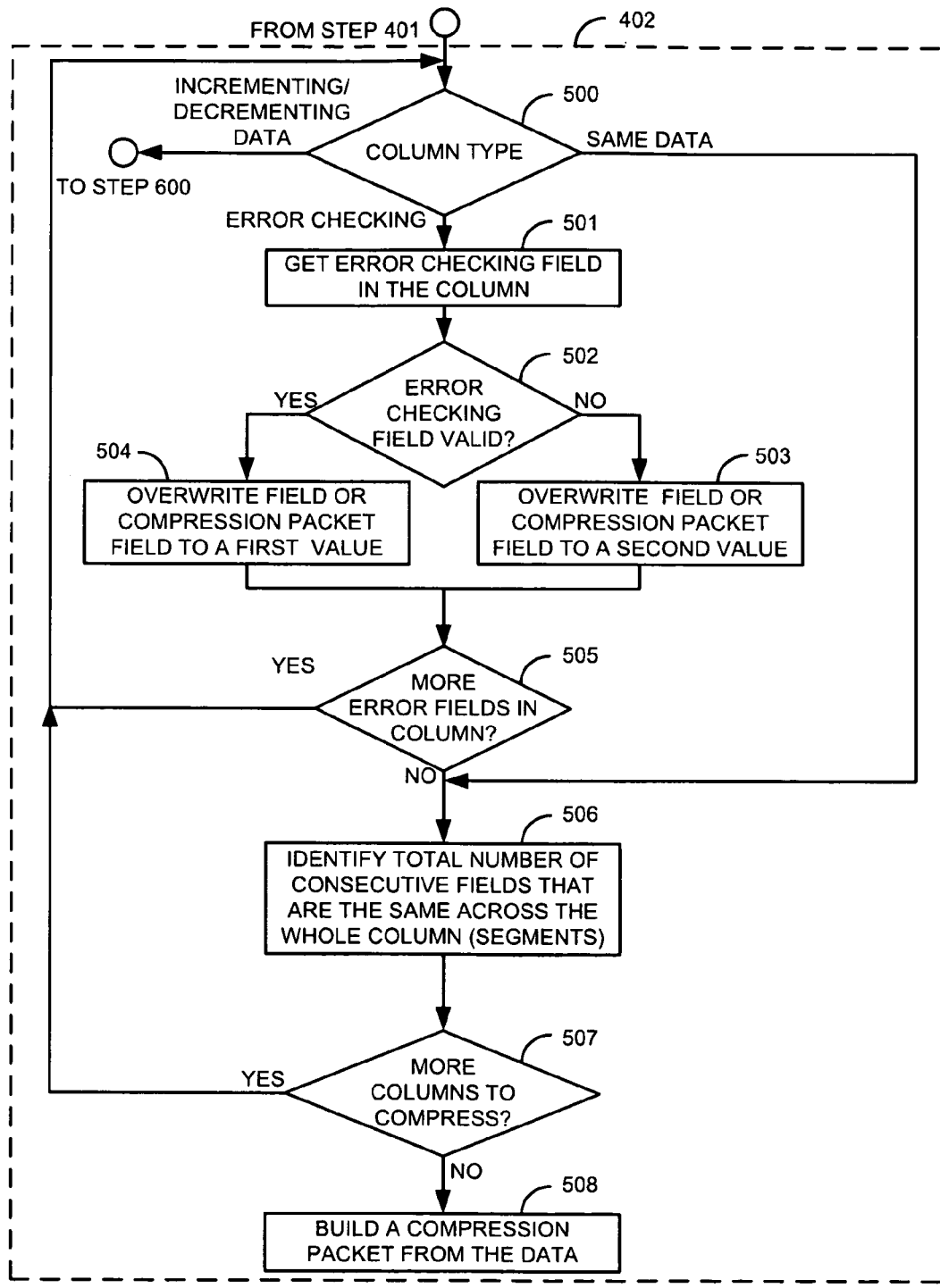
FIG. 5 is a flow diagram of a method for compressing columns where fields in the column contain error checking fields and/or fields in the column contain the same data.

FIG. 5 is a flow diagram of a method for compressing columns where fields in the column contain error checking fields (e.g. Column 3 in FIG. 3) and/or fields in the column contain the same data (e.g. Column 1 in FIG. 3). FIG. 5 is an expanded view of step 402 in FIG. 4. The method of FIG. 5 is one of many ways that could be used to compress data in columns.

The process begins by the compression module 212 checking 500 the column type. If the data to be compressed in the column is the same data (e.g. Column 1 in FIG. 3), the process goes to step 506. If data to be compressed in the column is incrementing/decrementing data (e.g. Column 2 in FIG. 3), the process goes to step 600 of FIG. 6. Otherwise, if the data to be compressed in the column is an error checking field (e.g. Column 3 in FIG. 3), the compression module 212 gets 501 an error checking field in the column (usually starting with the first field in the column). The compression module 212 verifies 502 if the error checking field is valid. If the error checking field is valid in step 502, the compression module 212 overwrites 504 the error checking field with a first value. In an alternative embodiment, instead of setting the error checking field to a first value, the compression module 212 could set 504 a bit(s) in the compression packet 350 to a first value which represents that the error checking field was valid. If the error checking field is not valid in step 502, the compression module 212 overwrites 503 the error checking field with a second value. In an alternative embodiment, instead of setting the error checking field to a second value, the compression module 212 could set 503 a bit(s) in the compression packet 350 to a second value which represents that the error checking field was invalid.

The compression module 212 checks 505 if there are more error checking fields in the column. If there are more error checking fields in the column in step 505, the process goes to step 500. Otherwise, the compression module 212 identifies 506 the total number of consecutive fields across the column that are the same. If there are multiple sections that have consecutive fields, then each section of the column will be identified in step 506. The compression module 212 checks 507 if there are more columns to compress. If there are more columns to compress in step 507, the process goes to step 500. Otherwise, if there are no more columns to compress in step 507, the compression module builds 508 a compression packet 350 from the data identified in step 506. The compression packet 350 comprises the total number of the consecutive field(s) in each segment and the data from one of the consecutive fields in each segment as shown in FIG. 3.

Figure 6:
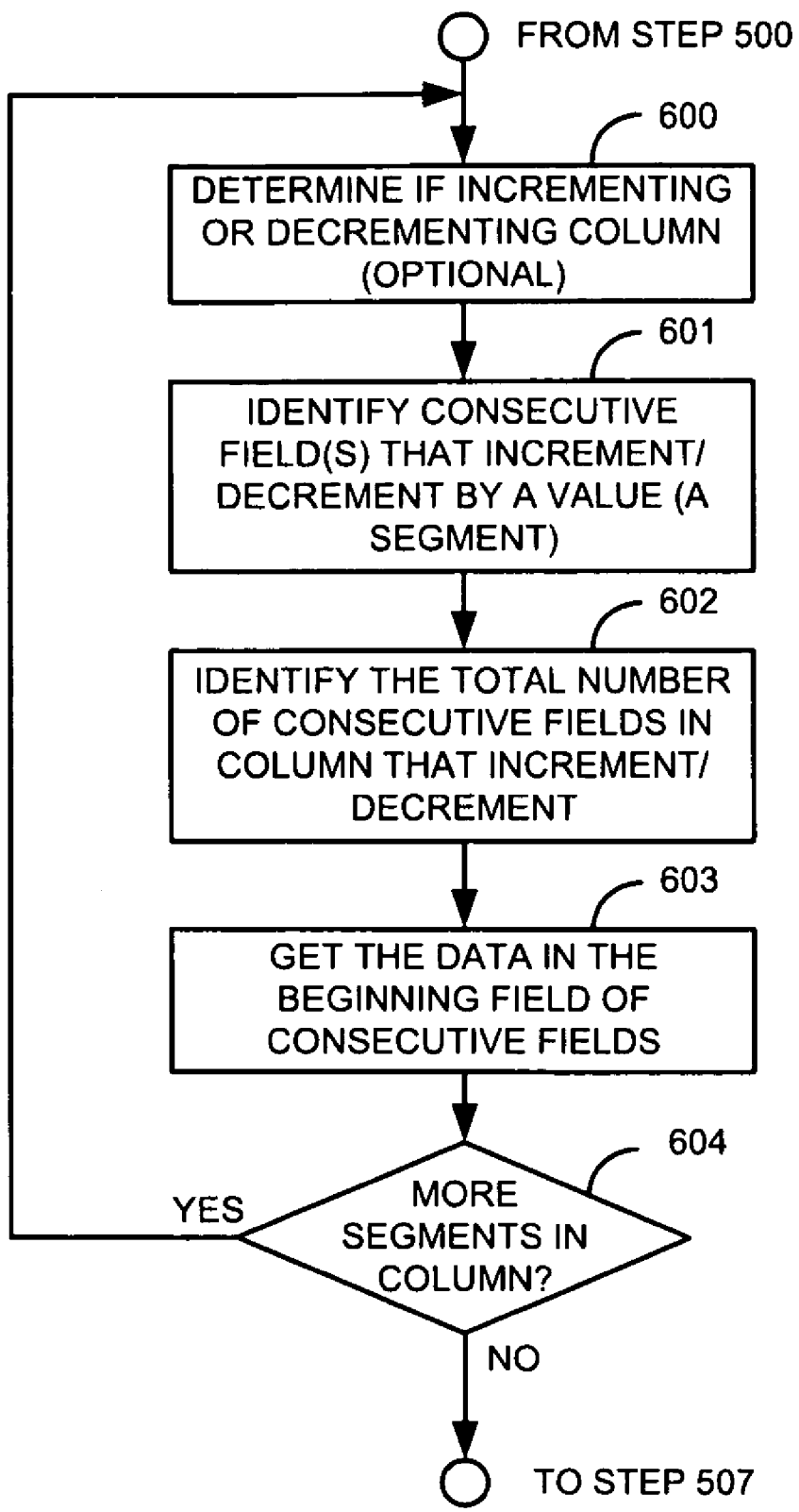
FIG. 6 is a flow diagram of a method for compressing columns where the fields in the column contain data that increments/decrements.

FIG. 6 is a flow diagram of a method for compressing columns where the fields in the column contain data that increments/decrements. The process begins after the compression module 212 determines 500 that the column has incrementing/decrementing data. The compression module 212 identifies 600 if the column is incrementing or decrementing. Step 600 is optional if there are only incrementing columns in the array of packets 310 or if there are only decrementing columns in the array of packets 310. If both incrementing and decrementing columns are in the array of packets 310, then an identifier of whether the column is incrementing and decrementing is typically required. The compression module 212 identifies 601 if the data in consecutive fields increment/decrement by a value (a segment). If all the fields in the column increment by that value, there would only be one segment. If, for example, the data in the column was 0004, 0003, 0001, and 0000, then there would be two decrementing segments (one for 0004-0003, and one for 0001-0000).

The compression module 212 identifies 602 the total number of consecutive fields in the column segment that decrement/increment. The compression module 212 gets 603 the data in the beginning field of the consecutive field of the segment of the column (using the above example, 0004 for the first segment). The data collected in steps 600-602 is used to build the compression packet 350 in step 508. The compression module 212 determines 604 if there are more segments in the column. If there are more segments in the column in step 604, the process goes to step 600. Otherwise, if there are no more segments in the column in step 604, the process goes to step 507 to determine if there are more columns to compress.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

What is claimed is:

1. A system for compressing data comprising:
   a packet processing module configured to:
      receive a plurality of packets, wherein each of the plurality of packets comprises a protocol header, each said protocol header comprising two or more fields, each said field comprising data, and wherein each said protocol header in the plurality of packets is a same header of a specific protocol;
      organize the plurality of packets into an array of packets, wherein the array of packets comprises a plurality of rows and two or more columns, wherein each packet of the plurality of packets forms one row of the plurality of rows and the two or more fields of the protocol form the two or more columns;
   a compression module configured to:
      compress the data in a first column of the two or more columns;
      compress the data in a second column of the two or more columns;
      build a compression packet with the compressed data in the two or more columns;
      identify if the data in at least two consecutive fields in the first or second column increments or decrements by a value,
      responsive to the data in the at least two consecutive fields in the first or second column incrementing or decrementing by the value, identify a total number of the at least two consecutive fields in the first or second column, get the data in a beginning or ending field in the at least two consecutive fields in the first or second column, and
      build the compression packet that indicates the total number of the at least two consecutive fields in the first or second column, the increment or the decrement value, and the data in the beginning field or the ending field in the at least two consecutive fields in the first or second column.

2. The system of claim 1, wherein the compression module is further configured to:
   identify if the data in at least two consecutive fields in the column are the same,
   responsive to the data in the at least two consecutive fields in the column being the same, identify a total number of the at least two consecutive fields in the column that are the same, and
   build the compression packet that indicates the total number of the at least two consecutive fields in the column that are the same and comprises the data in one of the at least two consecutive fields in the column.

3. The system of claim 2, wherein one of the two or more fields is an error checking field and the compression module is further configured to:
   verify if each of the error checking fields in the column is valid,
   responsive to verifying that specific ones of the error checking fields in the column are valid, overwrite the specific ones of the error checking fields with a first value, and
   responsive to verifying that other specific ones of the error checking fields in the column are not valid, overwrite the other specific ones of the error checking fields with a second value.

4. The system of claim 3, wherein the error checking field is an item selected from the group comprising: a parity field, a checksum, and a cyclic redundancy check.

5. The system of claim 1, wherein one of the two or more fields is an error checking field and the compression module is further configured to:
   verify if each of the error checking fields in the column is valid,
   responsive to verifying that specific ones of the error checking fields in the column are valid, set a field in the compression packet to a first value, and
   responsive to verifying that specific ones of the error checking fields in the column are not valid, set the field in the compression packet to a second value.

6. The system of claim 1, wherein one of the two or more fields is an item selected from the group comprising: a timestamp, a source address, a destination address, a source port, a destination port, an identification field, a bit, a byte, a word, and a long word.

7. The system of claim 1, wherein the compression module is further configured to build the compression packet with the compressed data, and the packet processing module is further configured to send the compression packet based on one of the following:
   i. when the plurality of packets exceeds a threshold,
   ii. when a time period has been exceeded,
   iii. if a length of one of the plurality of packets is different from another packet of the plurality of packets, or
   iv. if the specific protocol in one of the plurality of packets is different from another packet of the plurality of packets.

8. The system of claim 7, wherein the packet processing module is further configured to:
   receive the plurality of packets by monitoring packets in a communication; and
   send the compression packet to a network monitor, and the network monitor is configured to receive the compression packet and decompress the compression packet.

9. The system of claim 7, wherein the compression packet includes a size of the array of packets.

10. The system of claim 1, wherein the specific protocol is an item selected from the group comprising: Internet Protocol, User Datagram Protocol, Transmission Control Protocol, Real Time Transport Protocol, H.323, Session Initiation Protocol, and High Level Data Link Control.

11. The system of claim 1, wherein the compression module is configured to compress the data in the column by compressing a plurality of sections of the data in the column.

12. A method for compressing data comprising:
   receiving, in a packet processing module, a plurality of packets, wherein each of the plurality of packets comprises a protocol header, each said protocol header comprising two or more fields, each said field comprising data, and wherein each said protocol header in the plurality of packets is a same header of a specific protocol;
   organizing in the packet processing module the plurality of packets into an array of packets, wherein the array of packets comprises a plurality of rows and two or more columns, wherein each of the plurality of packets forms one of the plurality of rows and the two or more fields of the plurality of packets form the two or more columns, wherein one of the two or more fields is an error checking field;
   compressing the data in a first column of the two or more columns, wherein compressing the data comprises:
      verifying in the compression module if each of the error checking fields in the first column is valid;
      responsive to verifying that specific ones of the error checking field in the first column are valid, setting in the compression module a field in the compression packet to a first value;
      responsive to verifying that specific ones of the error checking field in the first column are not valid, setting in the compression module the error checking field in the compression packet to a second value;
   compressing the data in a second column of the two or more columns; and
   building, in the compression module, a compression packet with the compressed data in the two or more columns.

13. The method of claim 12, wherein compressing the data in the first column further comprises:
   identifying in the compression module if the data in at least two consecutive fields in the first column are the same;
   responsive to the data in the at least two consecutive fields in the first column being the same, identifying in the compression module a total number of the at leak two consecutive fields in the first column that are the same; and
   building in the compression module the compression packet that indicates the total number of the at least two consecutive fields in the first column that are the same and comprises the data in one of the at least two consecutive fields in the first column.

14. The method of claim 13, wherein one of the two or more fields is an error checking field and further comprising:
   verifying in the compression module if each of the error checking fields in the first column is valid;
   responsive to verifying that specific ones of the error checking field in first column are valid, overwriting in the compression module the specific ones of the error checking field with a first value; and
   responsive to verifying that other specific ones of the error checking field in first column are not valid, overwriting in the compression module the other specific ones error checking field with a second value.

15. The method of claim 14, wherein the error checking field is an item selected from the group comprising: a parity field, a checksum, and a cyclic redundancy check.

16. The method of claim 12, wherein compressing the data in the first column further comprises:
   identifying in the compression module if the data in at least two consecutive fields in the first column increments or decrements by a value;
   responsive to the data in the at least two consecutive fields in the column incrementing or decrementing by the value, identifying in the compression module a total number of the at least two consecutive fields in the column;

getting in the compression module the data in a beginning field or an ending field in the least two consecutive fields in the column; and building in the compression module the compression packet that indicates the total number of the at least two consecutive fields in the first column, the increment value or decrement value, and the data in the beginning field or ending field in the at least two consecutive fields in the first column.

17. The method of claim 12, wherein one of the two or more fields is an item selected from the group comprising: a timestamp, a source address, a destination address, a source port, a destination port, an identification field, a bit, a byte, a word, and a long word.

18. The method of claim 12, further comprising the steps of building in the compression module the compression packet with the compressed data and sending from the compression packet based on one of the following:
   i. when the plurality of packets exceeds a threshold,
   ii. when a time period has been exceeded,
   iii. if a length of one of the plurality of packets is different from another packet of the plurality of packets, or
   iv. if the specific protocol in one of the plurality of packets is different from another packet of the plurality of packets.

19. The method of claim 18, wherein further comprising the steps of:
   sending from the packet processing module the compression packet to a network monitor;
   receiving at a network monitor the compression packet; and
   decompressing in the network monitor the compression packet.

20. The method of claim 18, wherein the compression packet includes a size of the array of packets.

21. The method of 12, wherein the specific protocol is an item selected from the group comprising: Internet Protocol, User Datagram Protocol, Transmission Control Protocol, Real Time Transport Protocol, H.323, Session Initiation Protocol, and High Level Data Link Control.

22. The method of claim 12, wherein the step of compressing the data in the first column further is accomplished by compressing a plurality of sections of the data in the column.

* * * * *

UNITED STATES PATENT AND TRADEMARK OFFICE
CERTIFICATE OF CORRECTION

| | | |
|---|---|---|
| PATENT NO. | : 8,144,734 B2 | Page 1 of 1 |
| APPLICATION NO. | : 12/436651 | |
| DATED | : March 27, 2012 | |
| INVENTOR(S) | : Jean Meloche | |

It is certified that error appears in the above-identified patent and that said Letters Patent is hereby corrected as shown below:

At Column 10, line 34, delete the word "leak" and replace it with --least-- therein.

At Column 10, line 65, after the words "in the" add --first-- therein.

Signed and Sealed this
Eighteenth Day of December, 2012

David J. Kappos
*Director of the United States Patent and Trademark Office*